United States Patent
Mashimo

(10) Patent No.: US 6,738,325 B2
(45) Date of Patent: May 18, 2004

(54) OPTICAL DISK UNIT CAPABLE OF REDUCING TRACKING OFFSET

(75) Inventor: Akira Mashimo, Tokorozawa (JP)

(73) Assignee: Teac Corporation, Tokyo (JP)

( * ) Notice: Subject to any disclaimer, the term of this patent is extended or adjusted under 35 U.S.C. 154(b) by 76 days.

(21) Appl. No.: 10/132,029

(22) Filed: Apr. 24, 2002

(65) Prior Publication Data

US 2002/0154583 A1 Oct. 24, 2002

(30) Foreign Application Priority Data

Apr. 24, 2001 (JP) .................................... 2001-126331

(51) Int. Cl.[7] ................................................. G11B 7/00
(52) U.S. Cl. ............................... 369/44.38; 369/44.31; 369/44.41
(58) Field of Search .......................... 369/44.41, 44.42, 369/44.37, 44.34, 44.35, 44.31, 44.38

(56) References Cited

U.S. PATENT DOCUMENTS 5,105,409 A * 4/1992 Kaku et al. ............... 369/44.31

FOREIGN PATENT DOCUMENTS

JP          11232649 A    8/1999

* cited by examiner

*Primary Examiner*—Nabil Hindi
(74) *Attorney, Agent, or Firm*—Anderson Kill & Olick, P.C.; Eugene Lieberstein; Michael N. Meller

(57) ABSTRACT

An optical disk unit, which performs tracking control by generating a tracking error signal based on detection signals of reflected lights of a main light beam for recording and reproduction and sub light beams for tracking, includes a first tracking error generation part generating a first tracking error component from the detection signals of the reflected light of the main light beam of a read-power time or an erase-power time, a second tracking error generation part generating a second tracking error component from the detection signals of the reflected lights of the sub light beams of a write-power time, and a subtraction part obtaining the tracking error signal for a recording time by subtracting the second tracking error component from the first tracking error component.

24 Claims, 11 Drawing Sheets

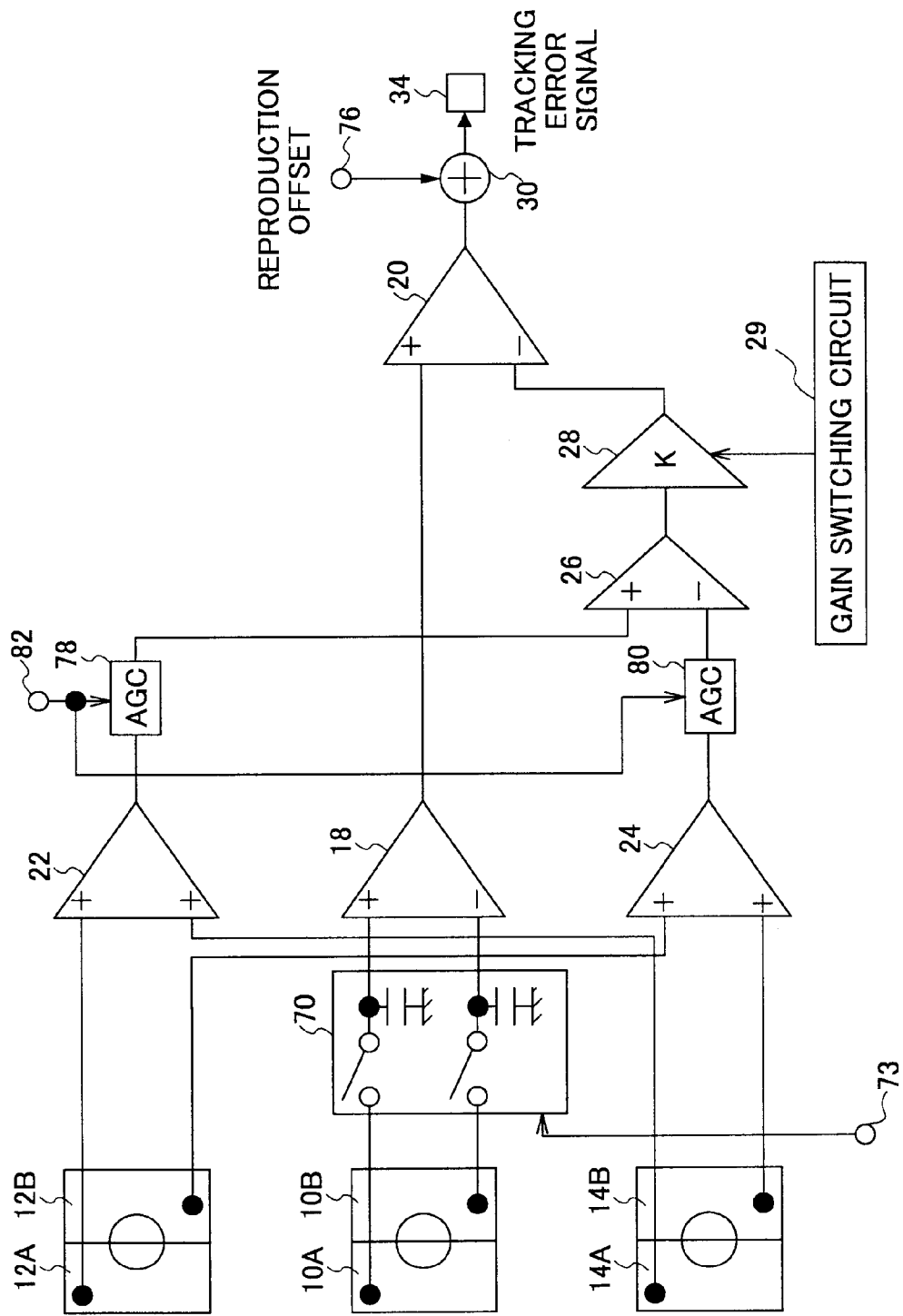

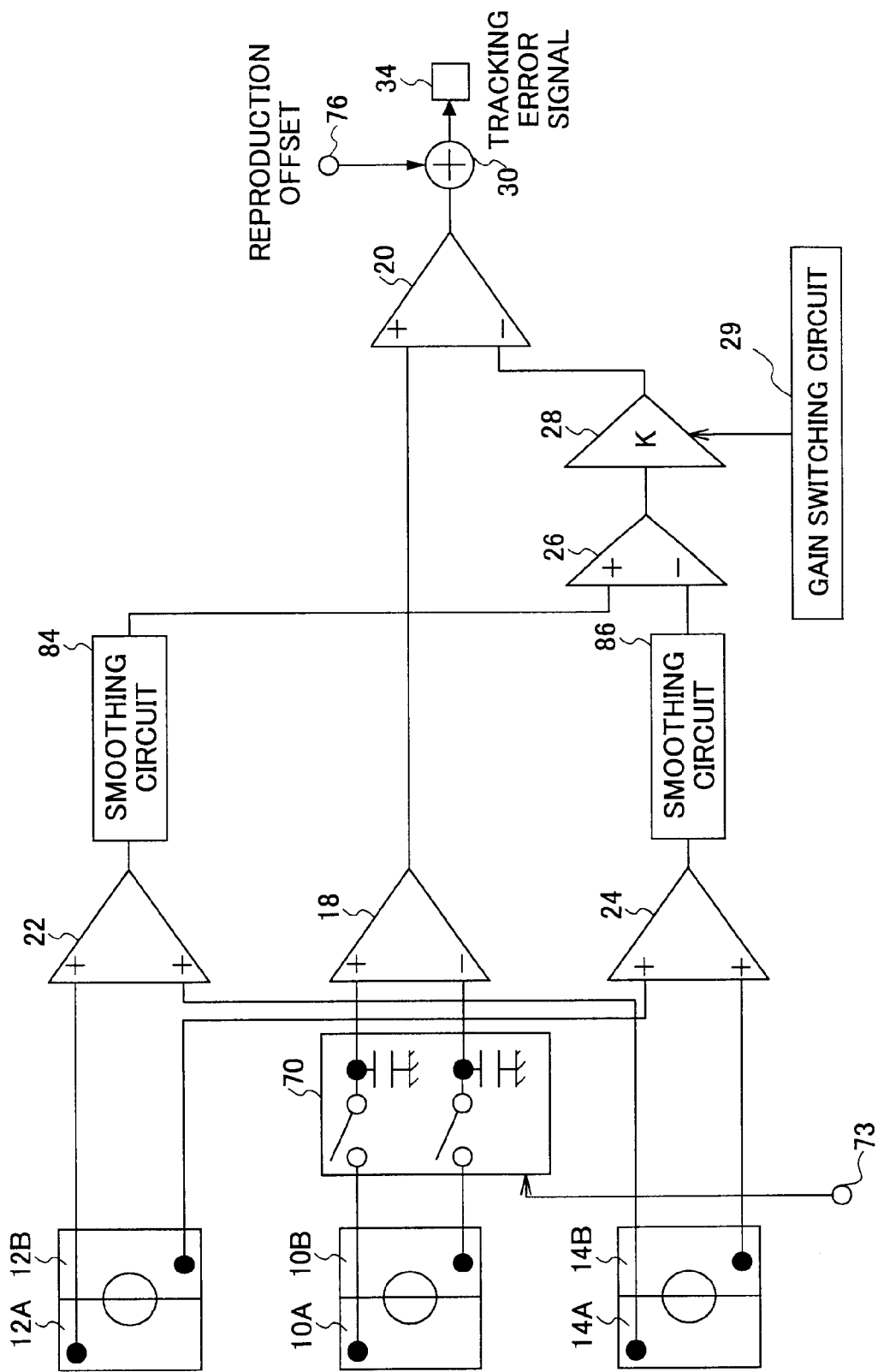

OPTICAL DISK UNIT CAPABLE OF REDUCING TRACKING OFFSET

BACKGROUND OF THE INVENTION

1. Field of the Invention

The present invention generally relates to optical disk units, and more particularly to an optical disk unit that can record data on an optical disk.

2. Description of the Related Art

Optical disks of a direct-read-after-write type can be categorized into two types: a write-once type and an erasable type. Guiding grooves are formed on a compact disk recordable (CD-R), which is a write-once optical disk, and a compact disk rewritable (CD-RW), which is an erasable optical disk. The grooves wobble slightly in a radial direction at a center frequency of 22.05 kHz. Address information at the time of recording called Absolute Time In Pregroove (ATIP) is multiplexed and recorded in the grooves by frequency shift keying (FSK) with a maximum deviation of ±1 kHz.

In an optical disk unit for data recording and reproduction of such a recordable optical disk, a light beam is emitted onto the optical disk, the reflected light is detected by a plurality of photodetectors, a tracking error signal is generated by performing a given calculation, and a tracking actuator is driven based on the tracking error signal by a tracking servo circuit.

Here, in an optical disk unit for data recording and reproduction of the CD-R that is a write-once optical disk, the power of a light beam is set to a read power at the time of reproduction, while, at the time of recording, the power of the light beam alternates between a write power and the read power (write power>read power) in accordance with the value 0 and the value 1 of a recording signal. Therefore, at the time of not only reproduction but also recording, a tracking error signal is generated by sampling and holding a reflected light of a time at which the power of the light beam is set to the read power.

Further, in an optical disk unit for data recording and reproduction of the CD-RW that is an erasable optical disk, the power of a light beam alternates between a write power and an erase power (write power>erase power>read power) in accordance with the value 0 and the value 1 of a recording signal at the time of recording.

Therefore, at the time of reproduction, a tacking error signal is generated by detecting a reflected light of a time at which the power of the light beam is set to the read power, while, at the time of recording, the tracking signal is generated by sample-holding a reflected light of a time at which the power of the light beam is set to the erase power.

This is because a reflected light of a time at which the power of the light beam is set to the write power is unstable due to the effect of formation of recording regions, which are pits in the CD-R and marks in the CD-RW.

The differential push-pull method is one of the known tracking control methods. According to the differential push-pull method, a spot 2 of a main light beam (a main light beam spot 2) is formed on a groove 1 forming a track n and leading and trailing spots 3 and 4 of sub light beams (leading and trailing sub light beam spots 3 and 4) are formed in positions separated from the main light beam spot 2 by a given length in directions opposite to each other along the width of the groove 1 as shown in FIG. 1. The leading sub light beam spot 3 precedes the main light beam spot 2 in a scanning direction indicated by the arrow in FIG. 1. The trailing sub light beam spot 4 follows the main light beam spot 2 in the scanning direction. A reflected beam from the main light beam spot 2 is detected by two photodetectors 10A and 10B shown in FIG. 2 that are divided in the directions of the width of the groove 1 perpendicular to the scanning direction of FIG. 1. A reflected beam from the leading sub light beam spot 3 is detected by two photodetectors 12A and 12B that are divided in the width directions of the groove 1. A reflected beam from the trailing sub light beam 4 is detected by two photodetectors 14A and 14B that are divided in the width directions of the groove 1. The letters As and Bs of the light beam spots 2 through 4 of FIG. 1 correspond to the detectors 10A and 10B, 12A and 12B, and 14A and 14B of FIG. 2, respectively.

FIG. 2 is a diagram showing a configuration of a conventional tracking error signal generation circuit employing the differential push-pull method. In FIG. 2, the detection signals of the photodetectors 10A and 10B are supplied via a sample-and-hold circuit 16 to the non-inverting input terminal and the inverting input terminal of a subtractor circuit 18, respectively. A difference signal output from the subtractor circuit 18 is supplied to the non-inverting terminal of a subtractor circuit 20. The sample-and-hold circuit 16 samples the detection signals of the photodetectors 10A, 10B, 12A, 12B, 14A, and 14B at read-power or erase-power timings and holds the sampled detections signals during a write-power time (period).

The detection signals of the photodetectors 12A and 12B are supplied via the sample-and-hold circuit 16 to one input terminal of an adder circuit 22 and one input terminal of an adder circuit 24, respectively. The detection signals of the photodetectors 14A and 14B are supplied via the sample-and-hold circuit 16 to the other input terminal of the adder circuit 22 and the other input terminal of the adder circuit 24, respectively. The adder circuit 22 adds the two supplied signals and supplies an output signal to the non-inverting input terminal of a subtractor circuit 26. The adder circuit 24 adds the two supplied signals and supplies an output signal to the inverting input terminal of the subtractor circuit 26. A difference signal output from the subtractor circuit 26 is amplified by a gain k in an amplifier 28 for the differential push-pull method and supplied to the inverting input terminal of the subtractor circuit 20.

An error signal output from the subtractor circuit 20 is supplied to an adder 30, which adds an offset at the time of reproduction or recording (a reproduction or recording offset) supplied from a switch 32 to the error signal. Thereby, the error signal is output from a terminal 34 as a tracking error signal (TES). By performing tracking control so that the tracking error signal is caused to be zero, tracking is performed so that the main light beam spot 2 follows the center of the groove 1.

The read power and the write power, and further, the erase power and the write power of a laser light (a light beam) emitted from a laser diode are different so as to cause a shift of the optical axis of the laser light. As shown in FIG. 3, a laser light emitted from a laser diode 36 is as indicated by a solid line at a read-power or erase-power time and as indicated by a broken line at a write-power time, thus causing a shift of the optical axis of the laser light by an angle θ. If the shift of the optical axis is caused in the width directions of the groove 1, recording regions (pits in the case of the CD-R) formed by the write power of the laser light are deviated from the center of the groove 1 since the tracking error signal is also generated at the read-power or erase-power time at the time of recording. In order to correct this deviation of the recording regions, the switch 32 is provided to perform switching between the reproduction offset and the recording offset. During recording, the switch 32 remains switched to the recording-offset side all the time.

In the production process of the conventional optical disk unit, a signal is actually recorded on an optical disk and the recorded signal is reproduced. Thereby, the offset of the tracking error signal at the time of recording is detected and maintained. However, if a change in the characteristic of the laser diode 36 is caused by a change in temperature or the passage of time so as to effect a change in the amount of a shift of the optical axis from its position at the read-power time to its position at the write-power time, a tracking deviation is caused at the time of recording so as to prevent accurate tracking. This is because the fixed recording offset detected in the production process is employed.

When the fixed recording offset is always added to the tracking error signal generated at the read-power time as in the conventional case, the light beam may be focused into a spot whose center is on a track at the write-power time. However, at the read-power time, the light beam is focused into a spot whose center is deviated from the track since the recording offset is also added to the tracking error signal at the read-power time. This causes the problem of reduction in the accuracy of reading ATIP information (address information) obtained from the reflected light that is detected at the read-power time.

SUMMARY OF THE INVENTION

Accordingly, it is a general object of the present invention to provide an optical disk unit in which the above-described disadvantages are eliminated.

A more specific object of the present invention is to provide an optical disk unit that realizes reduction in an offset caused by the shift of the optical axis and an increase in the accuracy of reading ATIP information with a simple configuration.

The above objects of the present invention are achieved by an optical disk unit performing tracking control by generating a tracking error signal based on detection signals of reflected lights of a main light beam for recording and reproduction and sub light beams for tracking, the main light beam being focused into a spot centered on a center of a track of an optical disk, the sub light beams being focused into spots whose centers are offset from the center of the track in directions of a width of the track, the optical disk unit including a first tracking error generation part generating a first tracking error component from the detection signals of the reflected light of the main light beam of a read-power time or an erase-power time, a second tracking error generation part generating a second tracking error component from the detection signals of the reflected lights of the sub light beams of a write-power time, and a subtraction part obtaining the tracking error signal for a recording time by subtracting the second tracking error component from the first tracking error component.

The above objects of the present invention are also achieved by an optical disk unit performing tracking control by generating a tracking error signal based on detection signals of reflected lights of a main light beam for recording and reproduction and sub light beams for tracking, the main light beam being focused into a spot centered on a center of a track of an optical disk, the sub light beams being focused into spots whose centers are offset from the center of the track in directions of a width of the track, the optical disk unit including a first tracking error generation part generating a first tracking error component from the detection signals of the reflected light of the main light beam of a read-power time or an erase-power time, a second tracking error generation part generating a second tracking error component from the detection signals of the reflected lights of the sub light beams of all times of respective power levels, and a subtraction part obtaining the tracking error signal for a recording time by subtracting the second tracking error component from the first error component.

According to any of the above-described optical disk units, by using the fact that the reflected light of the main light beam shifts in a direction opposite to a direction in which the reflected light of each sub light beam shifts when the laser beam is switched from the read power to the write power, an offset resulting from the shift of the optical axis of the main light beam from its position at the read-power time (erase-power time) to its position at the write-power time at the time of recording can be reduced with a simple configuration. Further, an offset correction is performed so that the main light beam is focused to be centered on the track center at each of the read-power time (erase-power time) and the write-power time. This not only improves recording quality but also increases the accuracy of reading ATIP information detected from the reflected light of the main light beam at the read-power or erase-power timings at the time of recording.

BRIEF DESCRIPTION OF THE DRAWINGS

Other objects, features and advantages of the present invention will become more apparent from the following detailed description when read in conjunction with the accompanying drawings, in which:

FIG. 9 is a diagram showing a circuit configuration of a second embodiment of the tracking error signal generation circuit of the optical disk unit according to the present invention;

FIG. 10 is a diagram showing a circuit configuration of a third embodiment of the tracking error signal generation circuit of the optical disk unit according to the present invention.

DETAILED DESCRIPTION OF THE PREFERRED EMBODIMENTS

A description will now be given, with reference to the accompanying drawings, of embodiments of the present invention.

In the following description, a read-power (write-power, erase-power) time or period refers to a time at which a laser beam is set to a read power (write power, erase power), that is, the power of a laser beam is set to a read power (write power, erase power) level.

Figure 4:
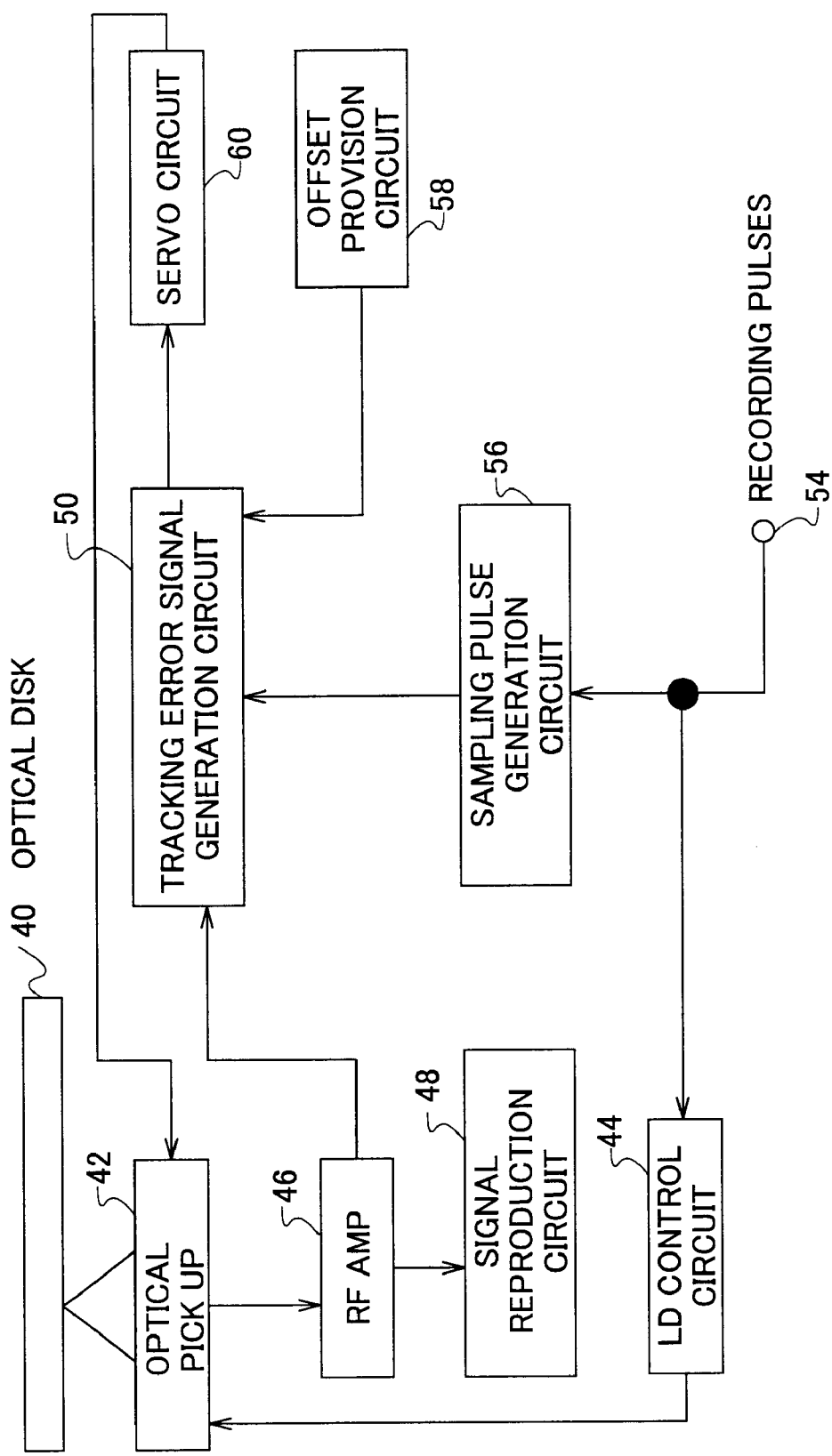
FIG. 4 is a block diagram showing an embodiment of an optical disk unit according to the present invention.

FIG. 4 is a block diagram of an embodiment of the optical disk unit of the present invention. According to FIG. 4, a direct-read-after-write optical disk 40 such as a CD-R or a CD-RW is rotated at a given rotational speed by a spindle motor (not shown in the drawing). An optical pickup 42 is moved in the radial direction of the optical disk 40 by a thread motor (not shown in the drawing). The optical pickup 42 includes an optical objective lens, an actuator, a ¼ wave plate, a collimator lens, a beam splitter, a light-emitting element (a laser diode), a front monitor, and a light-receiving element (photodetectors).

A laser diode (LD) control circuit 44 causes the laser diode in the optical pickup 42 to emit light with a read power (at a read-power level) at the time of reproduction and with a write power (at a write-power level) or the read power (with a write power, an erase power, or a read power in the case of the CD-RW) based on recording pulses (a recording pulse signal) at the time of recording, and further to output a laser beam (a light beam) accordingly. Further, the LD control circuit 44 controls a laser driver based on the light intensity of the laser beam detected in the front monitor in the optical pickup 42 so that the power (power level) of the laser beam is optimized.

An RF amplifier 46 is a head amplifier that amplifies signals reproduced from the optical disk 40 by the photodetectors in the optical pickup 42. The reproduced signals amplified by the RF amplifier 46 are supplied to a signal reproduction circuit 48 and a tracking error signal generation circuit 50.

The signal reproduction circuit 48 performs processing such as CIRC (cross-interleave Reed-Solomon code) decoding, EFM (eight to fourteen modulation) demodulation, and synchronization detection. Further, the signal reproduction circuit 48 performs processing such as decoding of ECC (error-correcting code) characteristic of a CD-ROM and header detection. Thereafter, the signal reproduction circuit 48 supplies reproduced data to a circuit of the next stage (not shown in the drawing).

Figure 5:
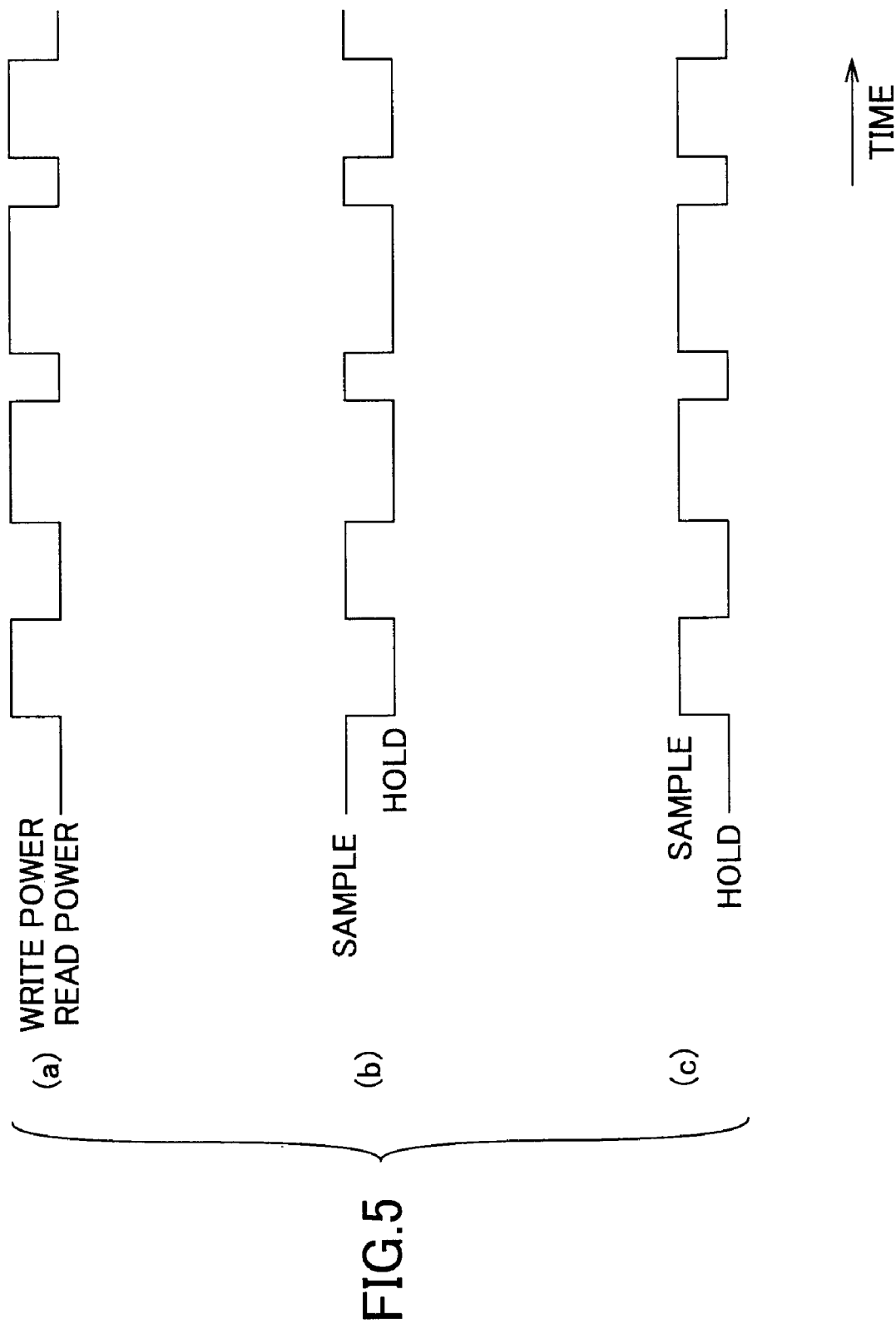
FIG. 5 is a timing chart of a recording pulse signal and sampling pulse signals according to the present invention.

The recording pulse signal input from a terminal 54 is supplied to the LD control circuit 44 and a sampling pulse generation circuit 56. The sampling pulse generation circuit 56 generates two types of sampling pulses (sampling pulse signals) indicated by (b) and (c) in FIG. 5 based on the recording pulse signal indicated by (a) in FIG. 5 and supplies the sampling pulse signals to the tracking error generation circuit 50. The sampling pulse signal indicated by (b) in FIG. 5 is at a low level to direct a later-described sample-and-hold circuit 70 to hold input signals when the recording pulse signal is at a high level indicating the write-power time (period) of the laser beam. The sampling pulse signal indicated by (c) in FIG. 5 is at a low level to direct later-described sample-and-hold circuits 72 and 74 to hold input signals when the recording pulse signal is at a low level indicating the read-power time (period) of the laser beam.

An offset provision circuit 58 prestores a reproduction offset and supplies the reproduction offset to the tracking error signal generation circuit 50. When the optical disk 40 is attached to the optical disk unit and the optical disk unit starts reproduction, the reproduction offset is automatically adjusted so that the offset is eliminated.

The tracking error signal generation circuit 50 samples and holds the detection signals of the photodetectors in accordance with the sampling pulse signals supplied from the sampling pulse generation circuit 56. Then, the tracking error signal generation circuit 50 generates a tacking error signal by adding the reproduction offset supplied from the offset provision circuit 58. The tracking error signal generation circuit 50 supplies the tracking error signal to a servo circuit 60 so that the servo circuit 60 performs tracking control by driving the actuator in the optical pickup 42.

Figure 2:
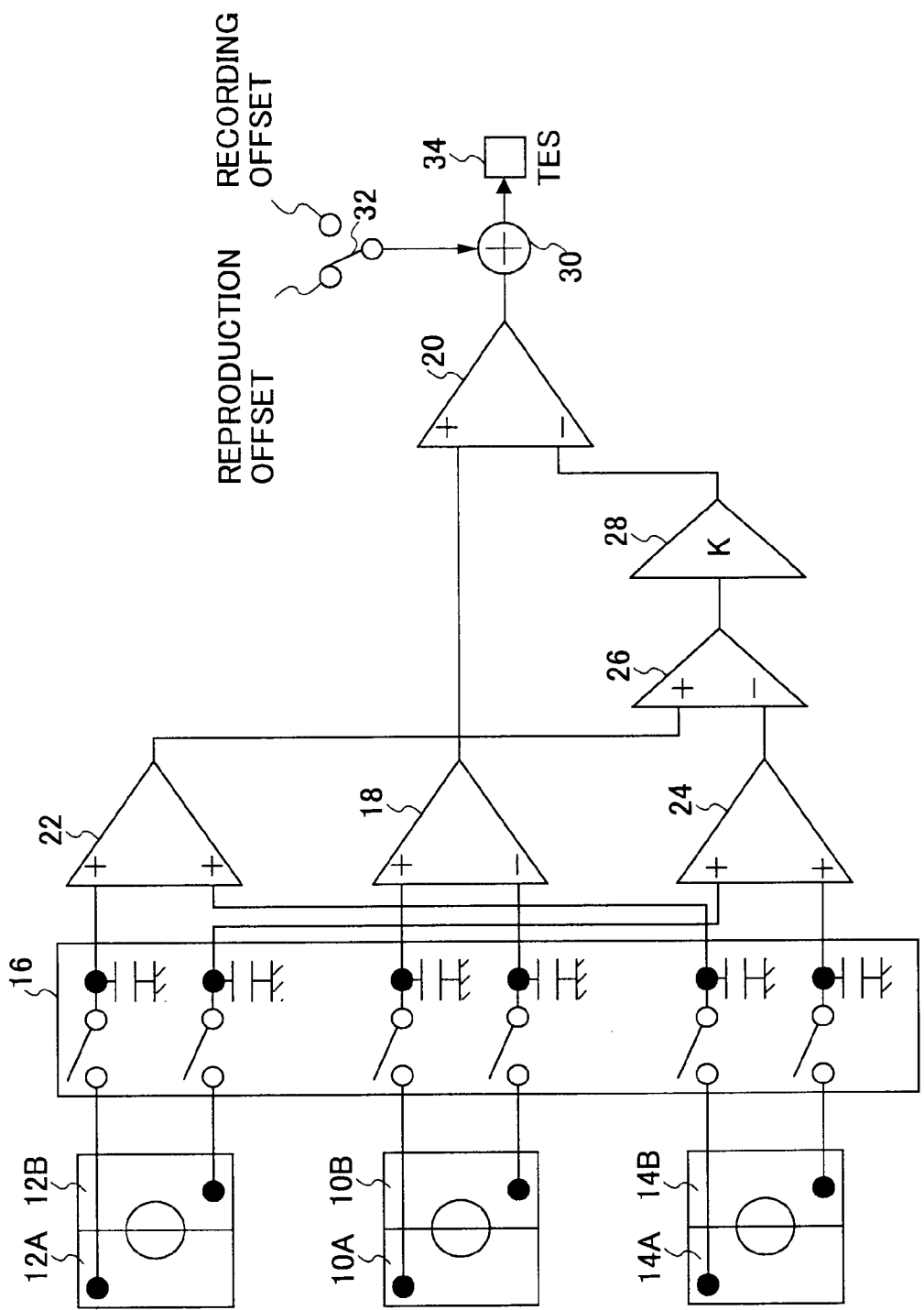
FIG. 2 is a diagram showing a configuration of a conventional tracking error detection circuit using the differential push-pull method.
Figure 3:
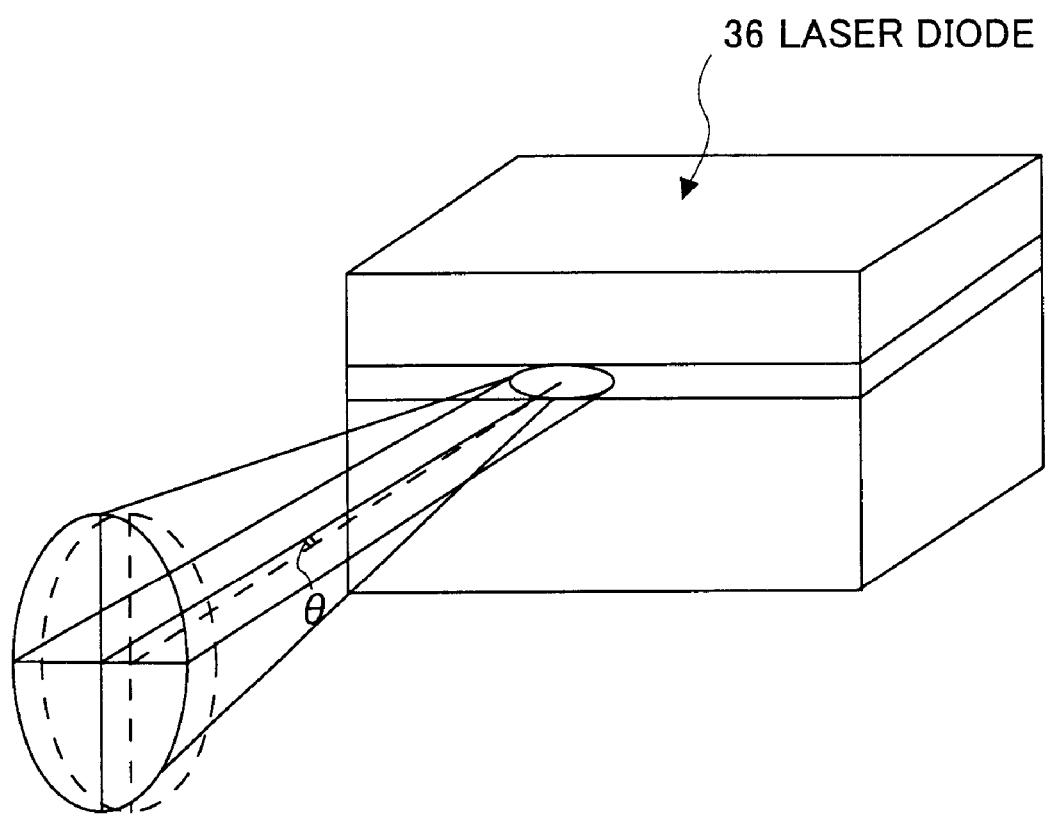
FIG. 3 is a diagram for illustrating a shift of an optical axis of a laser light emitted from a laser diode.
Figure 6:
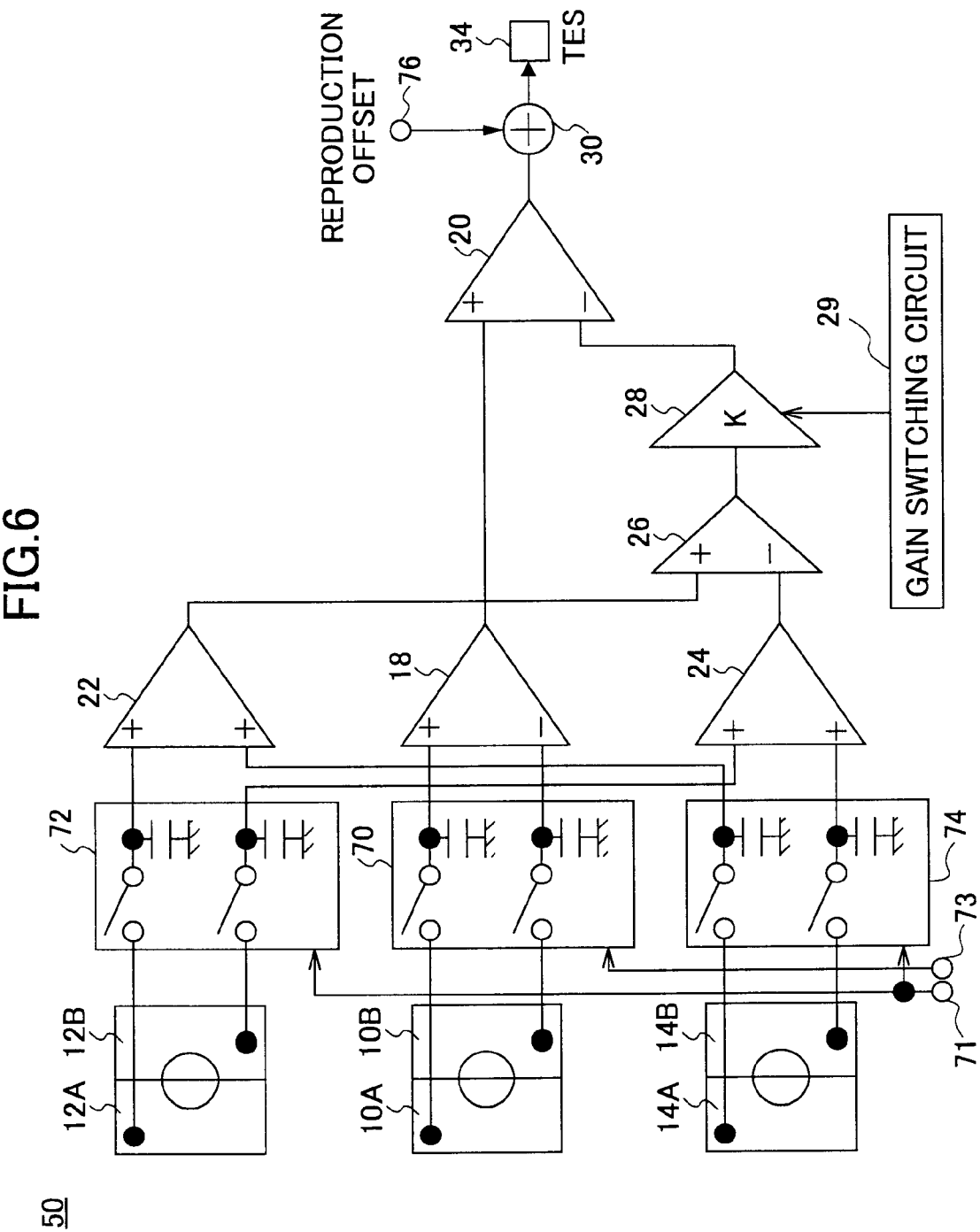
FIG. 6 is a diagram showing a circuit configuration of a first embodiment of a tracking error signal generation circuit according to the present invention.

FIG. 6 is a diagram showing a circuit configuration of a first embodiment of the tracking error signal generation circuit 50 of the optical disk unit of the present invention. In FIG. 6, the same elements as those of FIG. 2 are referred to by the same numerals.

In FIG. 6, the detection signals of the photodetectors 10A and 10B are supplied via the sample-and-hold circuit 70 to the non-inverting input terminal and the inverting input terminal of the subtractor circuit 18, respectively. The difference signal output from the subtractor circuit 18 is supplied to the non-inverting input terminal of the subtractor circuit 20. In FIG. 6, the RF amplifier 46 is omitted. The sample-and-hold circuit 70 is supplied with the sampling pulse signal indicated by (b) in FIG. 5 from a terminal 73 to sample the detection signals of the photodetectors 10A and 10B at read-power timings and hold the detection signals during the write-power time (period).

The detection signals of the photodetectors 12A and 12B are supplied via the sample-and-hold circuit 72 to one of the input terminals of the adder circuit 22 and one of the input terminals of the adder circuit 24, respectively. The detection signals of the photodetectors 14A and 14B are supplied via the sample-and-hold circuit 74 to the other input terminal of the adder circuit 22 and the other input terminal of the adder circuit 24, respectively.

The sample-and-hold circuit 72 is supplied with the sampling pulse signal indicated by (c) in FIG. 5 from a terminal 71 to sample the detection signals of the photodetectors 12A and 12B at write-power timings and hold the detection signals during the read-power time (period). The sample-and-hold circuit 74 is supplied with the sampling pulse signal indicated by (c) in FIG. 5 from the terminal 71 to sample the detection signals of the photodetectors 14A and 14B at the write-power timings and hold the detection signals during the read-power time (period).

Figure 1:
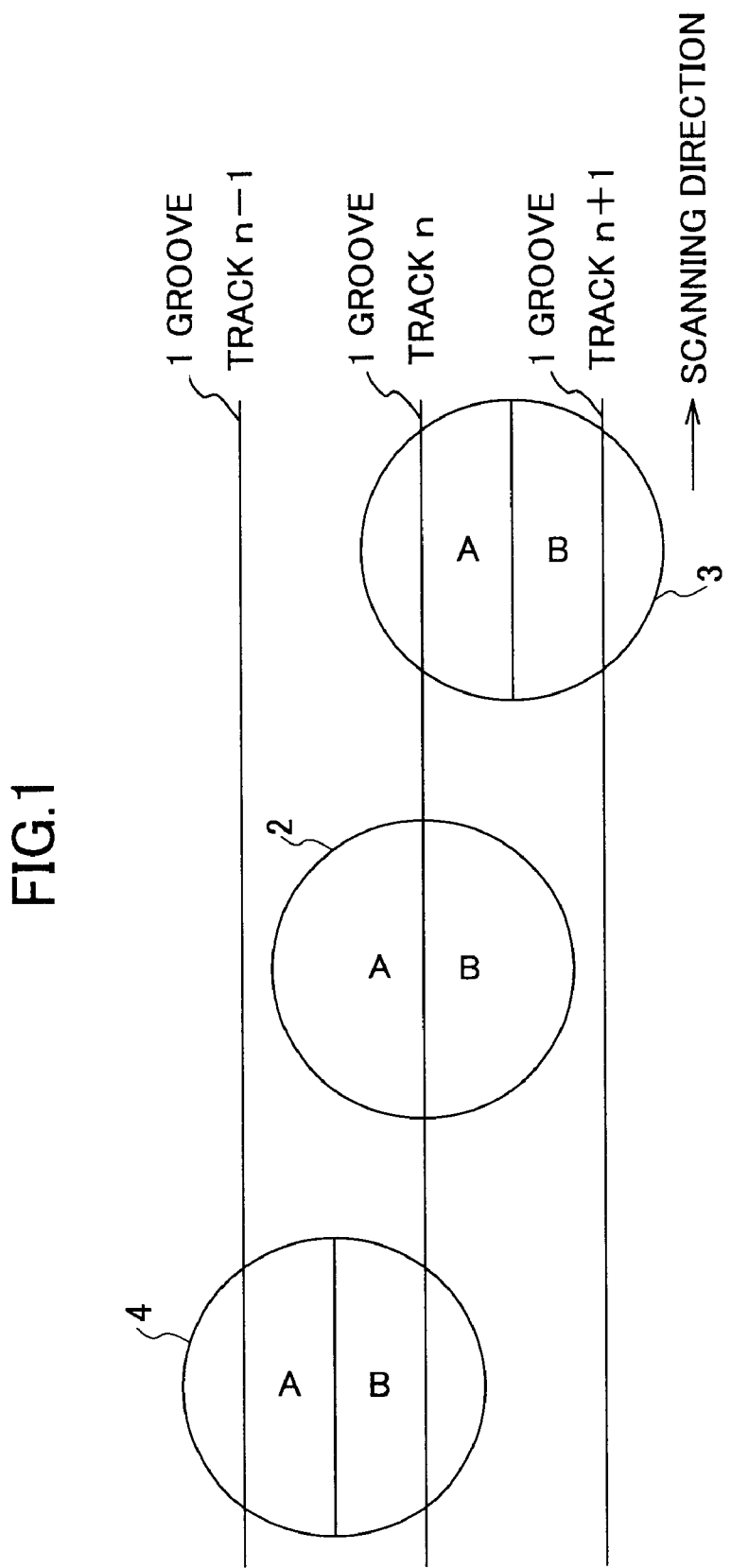
FIG. 1 is a diagram showing three light beam spots according to the differential push-pull method.
Figure 7:
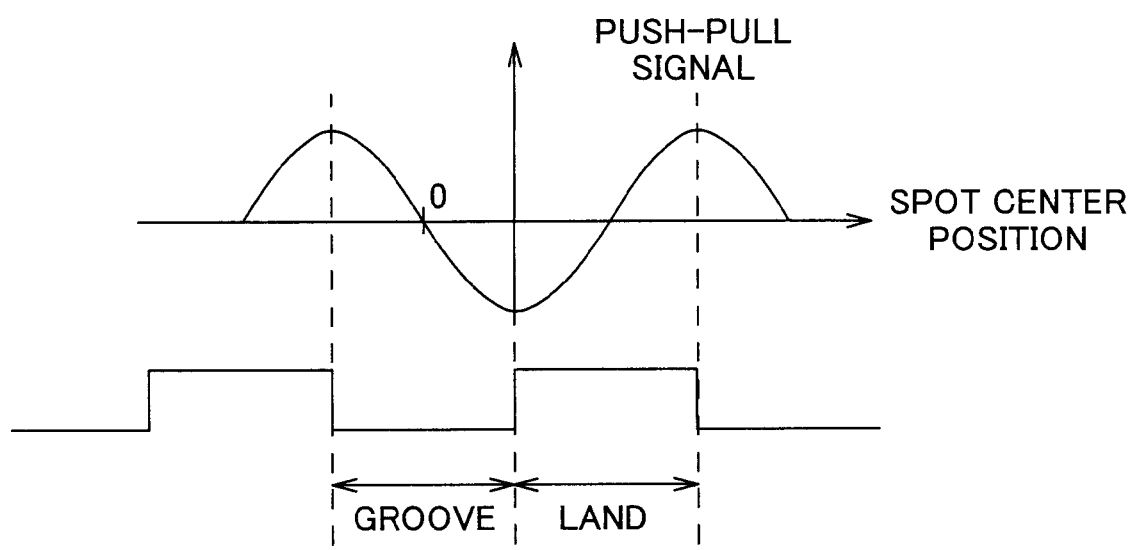
FIG. 7 is a diagram showing a push-pull signal generated when a main light beam spot is centered on a track center according to the present invention.

With the main light beam spot 2 being centered on the track n, or the groove 1, a push-pull signal, which is a signal of a difference between the outputs of the photodetectors 10A and 10B detecting the main light beam, is zero, and the sub light beam spots 3 and 4 are centered on the center of a land (a region between adjacent grooves) between the track n and a track n+1 and on the center of a land between the track n and a track n−1, respectively, as shown in FIGS. 1 and 7. The center of each land is offset from the track n by a half track pitch. Therefore, the push-pull signal of the sub light beam spots 3 and 4 (the sum of a signal of a difference between the outputs of the photodetectors 12A and 12B and a signal of a difference between the outputs of the photodetectors 14A and 14B) is zero.

With the center of the main light beam spot 2 deviating from the track n (the groove 1) to the track n−1 or to the left with respect to the scanning direction, the detection signal of the photodetector 10A becomes larger than the detection signal of the photodetector 10B, so that the value of the push-pull signal is positive. If the main light beam spot 2 is formed to be centered on the center of the track n at the read-power time, a light reflected from the main light beam spot 2 is detected in the photodetector 10A in a region on the left of a solid line in the circle of FIG. 8B and in the photodetector 10B in a region on the right of a solid line in the circle of FIG. 8B. At this point, if the laser beam is switched to the write power, the light reflected from the main light beam spot 2 is detected, for instance, in the photodetector 10A in a region on the left of a broken line in the circle of FIG. 8B and in the photodetector 10B in a region on the right of a broken line in the circle of FIG. 8B. This is because the shift of the optical axis of the light beam is caused due to a difference between the read power and the write power of the laser beam as previously described.

Further, in this case, the centers of the sub light beam spots 3 and 4 deviate from the respective lands to the left with respect to the scanning direction, so that the value of the push-pull signal of the sub light beam spots 3 and 4 is negative. A light reflected from the leading sub light beam spot 3 is detected, at the read-power time, in the photodetector 12A in a region on the left of a solid line in the circle of FIG. 8A and in the photodetector 12B in a region on the right of a solid line in the circle of FIG. 8A. The light reflected from the leading sub light beam spot 3 is detected, at the write-power time, in the photodetector 12A in a region on the left of a broken line in the circle of FIG. 8A and in the photodetector 12B in a region on the right of a broken line in the circle of FIG. 8A. Likewise, a light reflected from the trailing sub light beam spot 4 is detected, at the read-power time, in the photodetector 14A in a region on the left of a solid line in the circle of FIG. 8C and in the photodetector 14B in a region on the right of a solid line in the circle of FIG. 8C. The light reflected from the trailing sub light beam spot 4 is detected, at the write-power time, in the photodetector 14A in a region on the left of a broken line in the circle of FIG. 8C and in the photodetector 14B in a region on the right of a broken line in the circle of FIG. 8C.

The adder circuit 22 adds the two supplied signals and supplies the output signal to the non-inverting input terminal of the subtractor circuit 26. The adder circuit 24 adds the two supplied signals and supplies the output signal to the inverting input terminal of the subtractor circuit 26. In order to perform the differential push-pull method, the difference signal output from the subtractor circuit 26, which is the reflection light intensity of the sub light beams, is amplified by the gain k, for instance, in the amplifier 28 so as to match the reflection light intensity of the main light beam. Thereafter, the difference signal is supplied to the inverting input terminal of the subtractor circuit 20. The error signal output from the subtractor circuit 20 is supplied to the adder 30. The gain k has different values at the time of recording and the time of reproduction. The amplifier 28 switches the values of the gain k based on a control signal supplied from a gain switching circuit 29.

The reproduction offset is supplied from the offset provision circuit 58 to the adder 30 through a terminal 76. The adder 30 generates the tracking error signal by adding the reproduction offset to the error signal. The tracking error signal is supplied from the terminal 34 to the servo circuit 60 so that the servo circuit 60 performs tracking control to cause the tracking error signal to be zero by driving the actuator in the optical pickup 42.

Figure 8A:
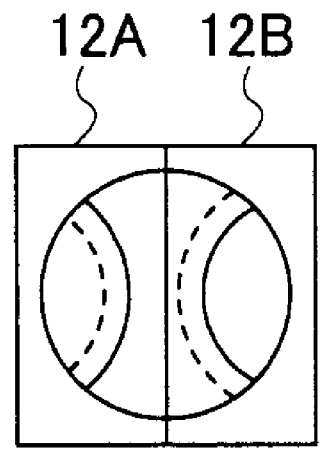
FIGS. 8A through 8C are diagrams for illustrating a shift of a light beam between a read-power time and a write-power time in each of the three light beam spots according to the differential push-pull method according to the present invention.
Figure 8B:
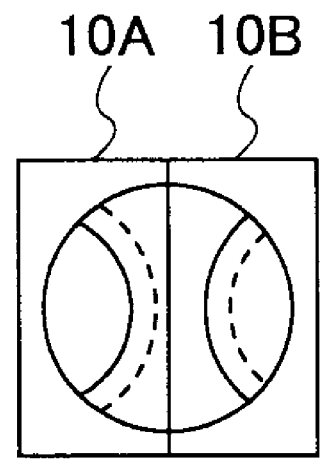
Figure 8C:
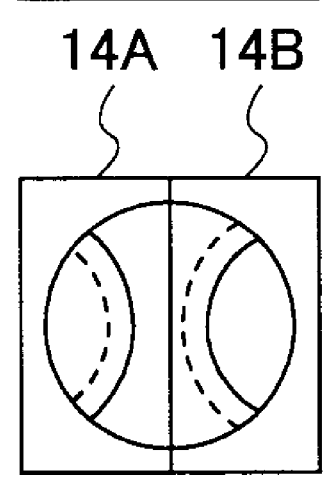

Here, letting the photodetectors 12A, 12B, 10A, 10B, 14A, and 14B shown in FIGS. 8A through 8C be A, B, C, D, E, and F, respectively, an error signal TE output from the subtractor circuit 20 is given by:

$$TE=(Cr-Dr)-k\cdot[(Aw+Ew)-(Bw+Fw)] \quad (1)$$

where k is the gain of the amplifier 28, r indicates the read-power time, and w indicates the write-power time.

As previously described, with the main light beam spot 2 being formed with its center being on the track n or the groove 1, the sample-and-hold circuit 70 also supplies the detection signals of the reflected light of the read power from the main light beam spot 2 at the time of recording. Therefore, the first term of the right-hand side of the equation (1) is zero. However, the sample-and-hold circuits 72 and 74 supply the detection signals of the reflected lights of the write power from the sub light beam spots 3 and 4. Thus, due to a deviation between the reflected light at the read-power time and the reflected light at the write-power time, the second term of the right-hand side of the equation (1) is not zero so that TE≠zero. A tracking deviation due to the shift of the optical axis of the main light beam spot 2 from its position at the read-power time to the position at the write-power time can be reduced by performing tracking control in this state so that TE becomes zero. Tracking control is performed so that the second term of the right-hand side of the equation (1) becomes zero at the write-power time. Thereafter, when the laser beam is successively switched to the read power, the optical axis shifts in the other direction. Therefore, tracking control is performed so that the first term of the right-hand side of the equation (1) becomes zero at the read-power time.

Thus, when the laser beam is switched from the read power to the write power, the reflected light of the main light beam shifts in a direction opposite to a direction in which the reflected light of each sub light beam shifts. Accordingly, by using this fact, an offset resulting from the shift of the optical axis of the main light beam from its position at the read-power time (a read-power position) to its position at the write-power time (a write-power position) at the time of recording can be reduced. Further, even if a change is caused in the amount of the shift of the optical axis from the read-power position to the write-power position due to a change in the characteristic of the laser diode caused by a change in temperature or the passage of time, the tracking deviation is reduced at the time of recording so that tracking can be performed with more accuracy. The circuit of FIG. 6 is not required to be larger in size than the conventional circuit of FIG. 2.

In order to completely correct the tracking deviation due to the shift of the optical axis of the main light beam caused between the read-power time and the write-power time, the tracking error signal is required to be obtained from the reflected light of each of the main light beam and the sub light beams at the write-power time by generating a tracking error component also from the reflected light of the main light beam at the write-power time. However, the reflected light of the main light beam at the write-power time is unstable due to the effect of formation of recording regions (pits in the case of the CD-R and marks in the case of the CD-RW). This makes it difficult to generate the main light beam tracking error component with accuracy. Further, the gain is required to be normalized by the amount of all the reflected lights, thus requiring the circuit to be larger in scale.

Furthermore, according to the present invention, a recording offset component is included in the tracking error signal at the stage of generation thereof. Therefore, tracking control is performed so that an offset is corrected from opposite directions toward a track center at the read-power time (the read-power time or the erase power-time in the case of the CD-RW) and the write-power time, respectively. For instance, if the optical axis of the laser beam shifts to the left from the track center when the laser beam is switched from the read power to the write power, tracking control is performed so that a rightward correction (toward the track center) is performed on the optical axis during the write-power time. When the laser beam is switched successively from the write power to the read power, the optical axis shifts to the right from the track center. Therefore, tracking control is performed so that correction is performed in the opposite direction, that is, in a leftward direction, during the read-power time. Thus, offset correction is performed at both of the read-power time (the read-power time or the erase-power time in the case of the CD-RW) and the write-power time so that the main light beam is focused to be centered on the track center. This not only improves recording quality but also increases the accuracy of reading ATIP information (address information) detected from the reflected light of the main light beam at the read-power time (at the read-power or erase-power time in the case of CD-RW) at the time of recording.

In this embodiment, at the time of reproduction, the detection signals obtained by detecting the main light beam and the sub light beams by the photodetectors 10A, 10B, 12A, 12B, 14A, and 14B are all sampled at the read-power time. Therefore, it is only required to switch the sampling pulse signals between the recording time and the reproduction time to detect the reflected light of each sub light beam.

In the circuit configuration, the sample-and-hold circuit 70 may be replaced by a bottom-hold circuit to hold the bottom level of each of the detection signals of the photodetectors 10A and 10B, and the sample-and-hold circuits 72 and 74 may be replaced by peak-hold circuits to hold the peak level of each of the detection signals of the photodetectors 12A, 12B, 14A, and 14B. The sampling pulse generation circuit 56 is required to use the sample-and-hold circuits 70, 72, and 74, thus increasing the circuit in size. However, by using the peak-hold circuits and the bottom-hold circuit, the circuit can be reduced in size, although bottom-hold circuits are required to hold the bottom level of each of the detection signals of the photodetectors 12A, 12B, 14A, and 14B at the time of reproduction.

FIG. 9 is a diagram showing a circuit configuration of a second embodiment of the tracking error signal generation circuit 50 of the optical disk unit of the present invention. In FIG. 9, the same elements as those of FIG. 2 are referred to by the same numerals.

In FIG. 9, the detection signals of the photodetectors 10A and 10B are supplied via the sample-and-hold circuit 70 to the non-inverting input terminal and the inverting input terminal of the subtractor circuit 18, respectively. The difference signal output from the subtractor circuit 18 is supplied to the non-inverting input terminal of the subtractor circuit 20. In FIG. 9, the RF amplifier 46 is omitted. The sample-and-hold circuit 70, based on the sampling pulse signal supplied from the terminal 73 (indicated by (b) in FIG. 5), samples the detection signals of the photodetectors 10A and 10B at the read-power timings and holds the sampled detection signals during the write-power time (period).

The detection signals of the photodetectors 12A and 12B are supplied to one of the input terminals of the adder circuit 22 and one of the input terminals of the adder circuit 24, respectively. The detection signals of the photodetectors 14A and 14B are supplied to the other input terminal of the adder circuit 22 and the other input terminal of the adder circuit 24, respectively.

The adder circuit 22 adds the two supplied signals and supplies an output signal to an automatic gain control (AGC) circuit 78. The AGC circuit 78, based on a control signal supplied via a terminal 82 from the LD control circuit 44, varies a gain according to whether the laser beam is set to the write power or the read power (whether the laser beam is set to the write power, the erase power, or the read power in the case of the CD-RW). Thereby, the AGC circuit 78 outputs a signal in which the intensity level of the reflected lights from the sub light beam spots 3 and 4 at the write-power time matches the intensity level of the reflected lights from the sub light beam spots 3 and 4 at the read-power time (at the erase-power time in the case of the CD-RW). The output signal is supplied to the non-inverting input terminal of the subtractor circuit 26.

The adder circuit 24 adds the two supplied signals and supplies an output signal to an automatic gain control (AGC) circuit 80. The AGC circuit 80, based on the control signal supplied via the terminal 82 from the LD control circuit 44, varies a gain according to whether the laser beam is set to the write power or the read power (whether the laser beam is set to the write power, the erase power, or the read power in the case of the CD-RW). Thereby, the AGC circuit 80 outputs a signal in which the intensity level of the reflected lights from the sub light beam spots 3 and 4 at the write-power time matches the intensity level of the reflected lights from the sub light beam spots 3 and 4 at the read-power time (at the erase-power time in the case of the CD-RW). The output signal is supplied to the inverting input terminal of the subtractor circuit 26.

In order to perform the differential push-pull method, the difference signal output from the subtractor circuit 26, which is the reflection light intensity of the sub light beams, is amplified by the gain k, for instance, in the amplifier 28 so as to match the reflection light intensity of the main light beam. Thereafter, the difference signal is supplied to the inverting input terminal of the subtractor circuit 20. The error signal output from the subtractor circuit 20 is supplied to the adder 30. The gain k has different values at the time of recording and reproduction. The amplifier 28 switches the values of the gain k based on the control signal supplied from the gain switching circuit 29. The amplifier 28 may be removed by substituting the gains of the AGC circuits 78 and 80 for the gain k of the amplifier 28.

The reproduction offset is supplied from the offset provision circuit 58 to the adder 30 via the terminal 76. The adder 30 generates the tracking error signal by adding the reproduction offset to the error signal. The tracking error signal is supplied from the terminal 34 to the servo circuit 60 so that the servo circuit 60 performs tracking control to cause the tracking error signal to be zero by driving the actuator in the optical pickup 42.

In this embodiment, at the time of recording, the shift of the reflected light of the main light beam between the read-power time (the read-power time or the erase-power time in the case of the CD-RW) and the write-power time is also corrected by using the tracking error components of the sub light beams. Therefore, even if a change is caused in the amount of the shift of the optical axis from the read-power position to the write-power position due to a change in the characteristic of the laser diode caused by a change in temperature or the passage of time, the tracking deviation is reduced at the time of recording so that the accuracy of reading the ATIP information can be increased. The circuit of FIG. 9 is not required to be larger in size than the conventional circuit of FIG. 2.

In the circuit configuration, the sample-and-hold circuit 70 may be replaced by a bottom-hold circuit to hold the bottom level of each of the detection signals of the photodetectors 10A and 10B. The sampling pulse generation circuit 56 is required to use the sample-and-hold circuits 70, thus increasing the circuit in size. However, by using the bottom-hold circuit, the circuit can be reduced in size.

FIG. 10 is a diagram showing a circuit configuration of a third embodiment of the tracking error signal generation circuit 50 of the optical disk unit of the present invention. In FIG. 10, the same elements as those of FIG. 9 are referred to by the same numerals. In this embodiment, smoothing circuits 84 and 86 replace the AGC circuits 78 and 80 of FIG. 9, respectively.

In FIG. 10, the detection signals of the photodetectors 10A and 10B are supplied via the sample-and-hold circuit 70 to the non-inverting input terminal and the inverting input terminal of the subtractor circuit 18, respectively. The difference signal output from the subtractor circuit 18 is supplied to the non-inverting input terminal of the subtractor circuit 20. In FIG. 10, the RF amplifier 46 is omitted. The sample-and-hold circuit 70, based on the sampling pulse signal supplied from the terminal 73 (indicated by (b) in FIG. 5), samples the detection signals of the photodetectors 10A and 10B at the read-power timings and holds the sampled detection signals during the write-power time (period).

The detection signals of the photodetectors 12A and 12B are supplied to one of the input terminals of the adder circuit 22 and one of the input terminals of the adder circuit 24, respectively. The detection signals of the photodetectors 14A and 14B are supplied to the other input terminal of the adder circuit 22 and the other input terminal of the adder circuit 24, respectively.

The adder circuit 22 adds the two supplied signals and supplies an output signal to the smoothing circuit 84. The smoothing circuit 84 smoothes the supplied signal all through the write-power time and the read-power time (the write-power time, the erase power time, and the read-power time in the case of the CD-RW) to output a signal in which the intensity level of the reflected lights from the sub light beam spots 3 and 4 at the write-power time matches the intensity level of the reflected lights from the sub light beam spots 3 and 4 at the read-power time (at the erase-power time in the case of the CD-RW). The output signal is supplied to the non-inverting input terminal of the subtractor circuit 26.

The adder circuit 24 adds the two supplied signals and supplies an output signal to the smoothing circuit 86. The smoothing circuit 86 smoothes the supplied signal all through the write-power time and the read-power time (the write-power time, the erase power time, and the read-power time in the case of the CD-RW) to output a signal in which the intensity level of the reflected lights from the sub light beam spots 3 and 4 at the write-power time matches the intensity level of the reflected lights from the sub light beam spots 3 and 4 at the read-power time (at the erase-power time in the case of the CD-RW). The output signal is supplied to the inverting input terminal of the subtractor circuit 26.

In order to perform the differential push-pull method, the difference signal output from the subtractor circuit 26, which is the reflection light intensity of the sub light beams, is amplified by the gain k, for instance, in the amplifier 28 so as to match the reflection light intensity of the main light beam. Thereafter, the difference signal is supplied to the inverting input terminal of the subtractor circuit 20. The error signal output from the subtractor circuit 20 is supplied to the adder 30. The gain k has different values at the time of recording and reproduction. The amplifier 28 switches the values of the gain k based on the control signal supplied from the gain switching circuit 29.

The reproduction offset is supplied from the offset provision circuit 58 to the adder 30 via the terminal 76. The adder 30 generates the tracking error signal by adding the reproduction offset to the error signal. The tracking error signal is supplied from the terminal 34 to the servo circuit 60 so that the servo circuit 60 performs tracking control to cause the tracking error signal to be zero by driving the actuator in the optical pickup 42.

In this embodiment, at the time of recording, the shift of the reflected light of the main light beam between the read-power time (the read-power time or the erase-power time in the case of the CD-RW) and the write-power time is also corrected by using the tracking error components of the sub light beams. Therefore, even if a change is caused in the amount of the shift of the optical axis from the read-power position to the write-power position due to a change in the characteristic of the laser diode caused by a change in temperature or the passage of time, the tracking deviation is reduced at the time of recording so that the accuracy of reading the ATIP information can be increased. The circuit of FIG. 10 is not required to be larger in size than the conventional circuit of FIG. 2.

Figure 11:
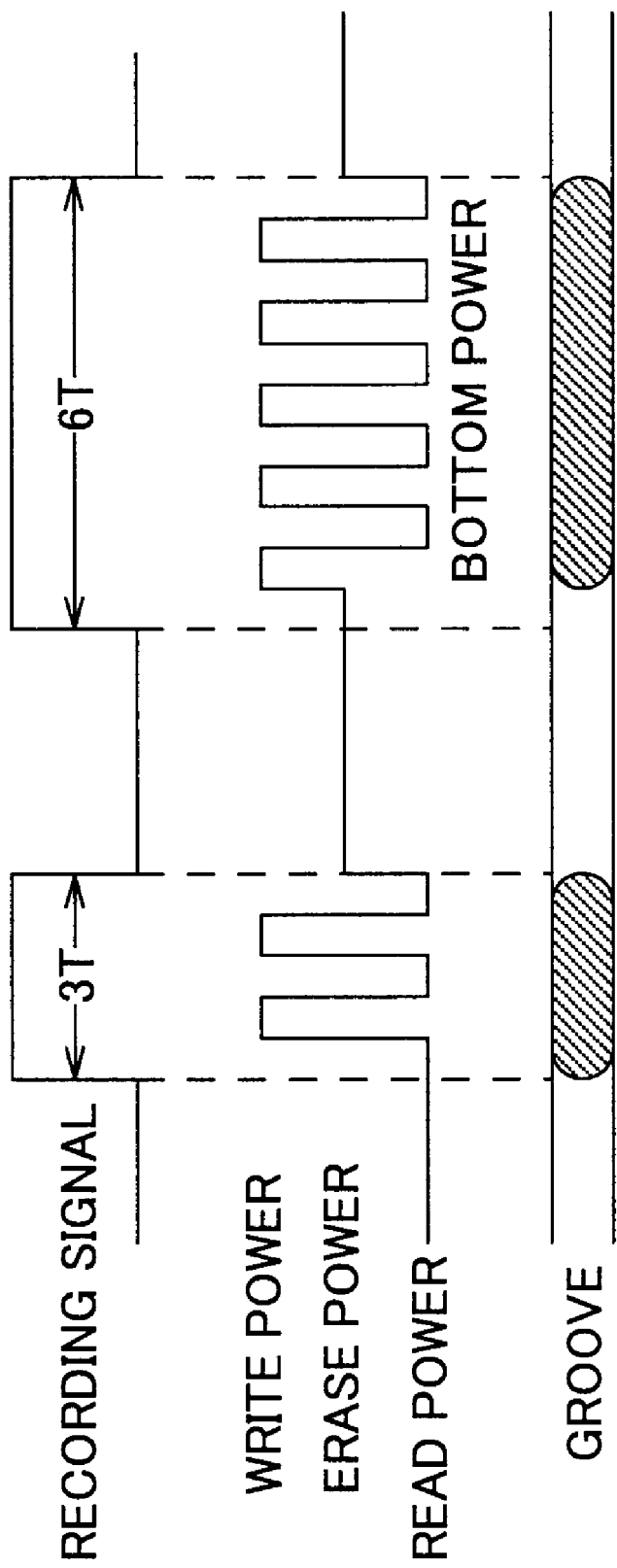
FIG. 11 is a diagram showing signal waveforms at a time of performing recording on an erasable optical disk according to the present invention.

In an optical disk unit for data recording and reproduction of the CD-RW that is an erasable optical disk, at the time of recording, a light beam power alternates between a write power and an erase power (write power>erase power>read power) in accordance with the value 0 and the value 1 of a recording signal as shown in FIG. 11. With respect to such an erasable optical disk, at the time of reproduction, a tracking error signal is generated by detecting a reflected light at timings at which the light beam power is set to the read power. On the other hand, at the time of recording, the sample-and-hold circuit 70 samples the reflected light at timings at which the light beam power is set to the erase power and holds the reflected light, while the sample-and-hold circuits 72 and 74 sample reflected lights at timings at which the light beam power is set to the write power and hold the reflected light. Thereby, the tracking error signal is generated.

The subtractor circuit 18 and the sample-and-hold circuit 70 form a first tracking error generation part of the optical disk unit of the present invention. The adder circuits 22 and 24, the subtractor circuit 26, and the sample-and-hold circuits 72 and 74 form a second tracking error generation part of the optical disk unit of the present invention. The second tracking error generation part of the optical disk unit of the present invention may also be formed by the adder circuits 22 and 24, the subtractor circuit 26, and the AGC circuits 78 and 80 or the smoothing circuits 84 and 86. The subtractor circuit 20 and the amplifier 28 form a subtraction part and a level adjustment part, respectively, of the optical disk unit of the present invention.

The present invention is not limited to the specifically disclosed embodiments, but variations and modifications may be made without departing from the scope of the present invention.

The present application is based on Japanese priority application No. 2001-126331 filed on Apr. 24, 2001, the entire contents of which are hereby incorporated by reference.

What is claimed is:

1. An optical disk unit performing tracking control by generating a tracking error signal based on detection signals of reflected lights of a main light beam for recording and reproduction and sublight beams for tracking, the main light beam being focused into a spot centered on a center of a track of an optical disk, the sub light beams being focused into spots whose centers are offset from the center of the track in directions of a width of the track, the optical disk unit comprising:
- a first tracking error generation part generating a first tracking error component from the detection signals of the reflected light of the main light beam of a first power level during recording;
- a second tracking error generation part generating a second tracking error component from the detection signals of the reflected lights of the sub light beams of a second power level higher than the first power level during the recording; and
- a subtraction part obtaining the tracking error signal during the recording by subtracting the second tracking error component from the first tracking error component.

2. The optical disk unit as claimed in claim 1, further comprising a level adjustment part performing adjustment between levels of the first and second tracking error components.

3. The optical disk unit as claimed in claim 2, wherein said level adjustment part performs the adjustment by performing gain control on the second tracking error component.

4. The optical disk unit as claimed in claim 3, wherein said level adjustment part performs the gain control by using a gain for the recording time.

5. The optical disk unit as claimed in claim 1, wherein said first tracking error generation part comprises a sample-and-hold circuit that samples the detections signals of the reflected light of the main light beam at the first power level and holds the sampled detection signals when the main light beam is at the second power level.

6. The optical disk unit as claimed in claim 5, wherein said first tracking error generation part further comprises a subtraction circuit obtaining a difference between the detection signals and outputting the difference as the first tracking error component.

7. The optical disk unit as claimed in claim 1, wherein said second tracking error generation part comprises sample-and-hold circuits that sample the detections signals of the reflected lights of the sub light beams at the second power level and holds the sampled detection signals when the sub light beams are at the first power level.

8. The optical disk unit as claimed in claim 7, wherein said second tracking error generation part further comprises a subtraction circuit obtaining a difference between first and second signals obtained based on the detection signals and outputting the difference as the second tracking error component.

9. The optical disk unit as claimed in claim 1, further comprising a light source whose optical axis is caused to shift between the first power level and the second power level.

10. An optical disk unit performing tracking control by generating a tracking error signal based on detection signals of reflected lights of a main light beam for recording and reproduction and sub light beams for tracking, the main light beam being focused into a spot centered on a center of a track of an optical disk, the sub light beams being focused into spots whose centers are offset from the center of the track in directions of a width of the track, the optical disk unit comprising:
- a first tracking error generation part generating a first tracking error component from the detection signals of the reflected light of the main light beam of a first power level during recording;
- a second tracking error generation part generating a second tracking error component from the detection signals of the reflected lights of the sub light beams of the first power level and a second power level different from the first power level during the recording; and
- a subtraction part obtaining the tracking error signal during the recording by subtracting the second tracking error component from the first tracking error component.

11. The optical disk unit as claimed in claim 10, further comprising a level adjustment part performing adjustment between levels of the first and second tracking error components.

12. The optical disk unit as claimed in claim 11, wherein said level adjustment part performs the adjustment by performing gain control on the second tracking error component.

13. The optical disk unit as claimed in claim 12, wherein said level adjustment part performs the gain control by using a gain for the recording time.

14. The optical disk unit as claimed in claim 10, wherein said first tracking error generation part comprises a sample-and-hold circuit that samples the detection signals of the reflected light of the main light beam at the first power level and holds the sampled detection signals when the main light beam is at the second power level.

15. The optical disk unit as claimed in claim 14, wherein said first tracking error generation part further comprises a subtraction circuit obtaining a difference between the detection signals and outputting the difference as the first tracking error component.

16. The optical disk unit as claimed in claim 10, wherein said second tracking error generation part comprises a level control part controlling intensity of each of first and second signals obtained based on the detection signals of the reflected lights of the sub light beams to a constant level.

17. The optical unit as claimed in claim 16, wherein said level control part comprises first and second automatic gain control circuits performing gain control on the first and second signals, respectively.

18. The optical unit as claimed in claim 16, wherein said level control part comprises first and second smoothing circuits smoothing the first and second signals, respectively.

19. The optical unit as claimed in claim 16, wherein said second tracking error generation part further comprises a subtraction circuit obtaining a difference between the first and second signals and outputting the difference as the second tracking error component.

20. The optical disk unit as claimed in claim 10, further comprising a light source whose optical axis is caused to shift between the first power level and the second power level.

21. The optical disk unit as claimed in claim 1, wherein the first power level is a read-power level and the second power level is a write-power level.

22. The optical disk unit as claimed in claim 1. wherein the first power level is an erase-power level and the second power level is a write-power level.

23. The optical disk unit as claimed in claim 10, wherein the first power level is a read-power level and the second power level is a write-power level.

24. The optical disk unit as claimed in claim 10, wherein the first power level is an erase-power level and the second power level comprises a read-power level and a write-power level.

* * * * *